UNITED STATES PATENT OFFICE.

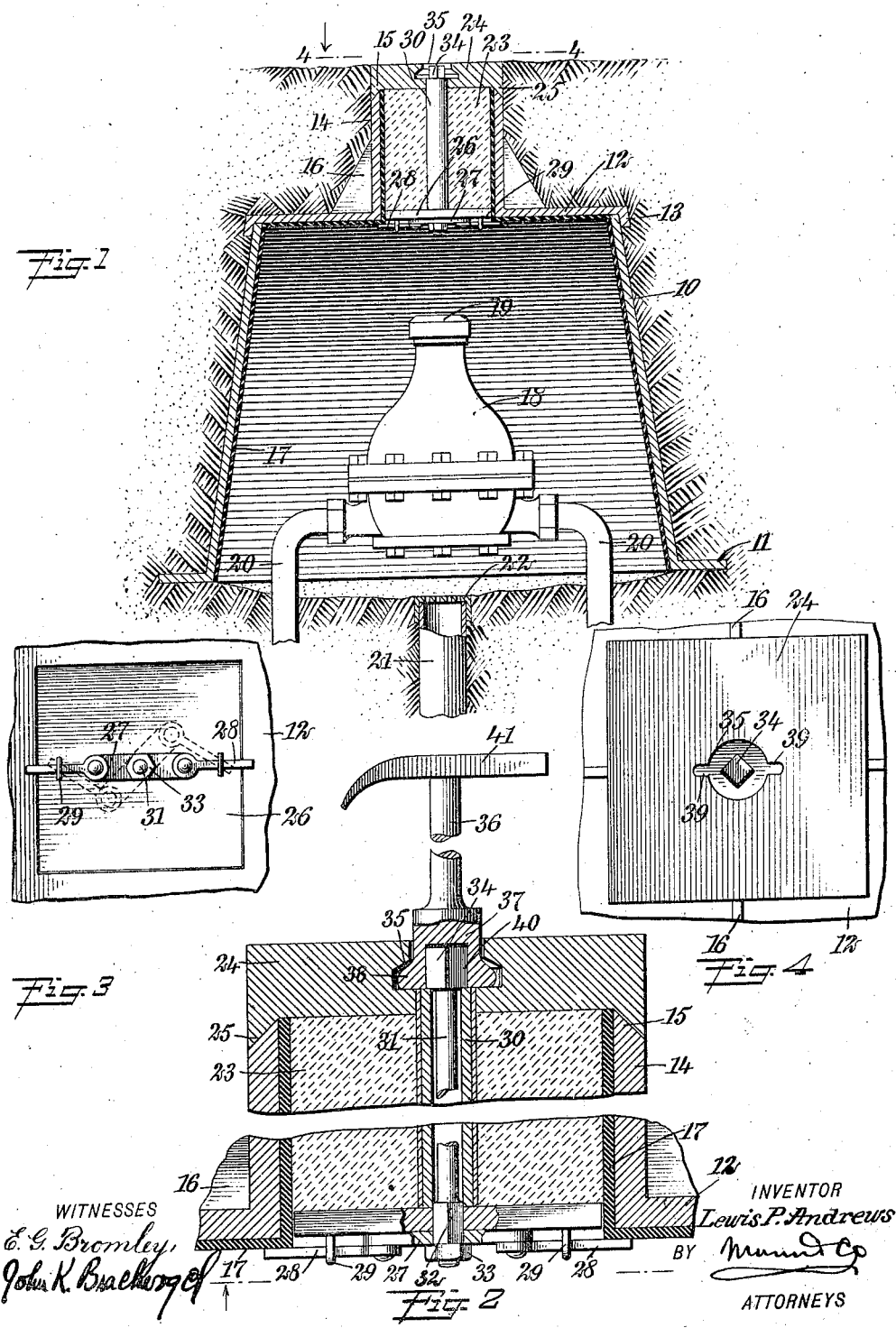

LEWIS P. ANDREWS, OF SEDALIA, MISSOURI.

METER-BOX.

950,270.

Specification of Letters Patent. Patented Feb. 22, 1910.

Application filed October 26, 1908. Serial No. 459,507.

*To all whom it may concern:*

Be it known that I, LEWIS P. ANDREWS, a citizen of the United States, and a resident of Sedalia, in the county of Pettis and State of Missouri, have invented a new and Improved Meter-Box, of which the following is a full, clear, and exact description.

This invention relates to meter boxes for incasing and protecting water meters and the like, and more particularly, to a meter box comprising a casing adapted to be buried in the ground, under roadways, etc., and having an opening in the top thereof, a plug for closing the opening, and having a cover fitting over the opening, and a lock at the inside of the plug and operable from the outside of the casing, the lock serving to secure the plug removably in place, the plug and the cover having a lock-controlling bolt extending therethrough and operable from the outside of the cover by means of a wrench or other suitable implement formed to fit into an opening provided for the purpose in the cover.

An object of the invention is to provide a simple, inexpensive and durable meter box, which serves as a protection for the meter incased therein, which can be easily opened to permit the meter to be read, the closure of which can be locked securely in place to prevent accidental or unauthorized opening thereof, and which is substantially water tight.

A further object of the invention is to provide a box of the class described, which tends to maintain a substantially even temperature about the meter, which may be provided with a heat insulating lining where necessary, and which can be easily drained of moisture should any accidentally enter the casing, the draining means serving at the same time as a conduit to conduct warmer air from the service mains which are buried at a point beneath the frost line of the ground.

The invention consists in the construction and combination of parts to be more fully described hereinafter and particularly set forth in the claims.

Reference is to be had to the accompanying drawings forming a part of this specification, in which similar characters of reference indicate corresponding parts in all the views; and in which—

Figure 1 is a longitudinal section showing an embodiment of my invention buried in the ground and inclosing a water meter; Fig. 2 is an enlarged longitudinal section of the upper part of the box, showing the closure for the same and having parts broken away; Fig. 3 is an inverted plan view of the top of the casing, showing the lower end of the plug and the locking mechanism; and Fig. 4 is a plan view of the cover showing a part of the top of the casing.

Before proceeding to a more detailed explanation of my invention, it should be clearly understood that water meters are often conveniently arranged in meter boxes buried in the ground at suitable points and not located in buildings. These meter boxes must have openings provided with suitable closures to permit the meters to be read. Frost tends to interfere seriously with the proper operation of a water meter, and it is essential, therefore, that the same be protected from low temperatures. My meter box affords such protection and at the same time permits the box to be opened when necessary, without difficulty, so that the readings of the meter can be ascertained.

The box, as illustrated, for example, has a casing which is provided with a lining of heat insulating material such as asbestos, felt or the like. This lining can be dispensed with if the meter box is used in a warm climate, and it is only necessary in localities subject to more or less severe frost.

Referring more particularly to the drawings, I provide a casing 10, which may be of any suitable form and may be angular or circular in section. In the embodiment shown for example, in the drawings, the casing is in the shape of a frustum of a pyramid or a cone and is open at the bottom and has an outwardly extending flange 11. At the upper edge, the casing has a top 12 provided with a downwardly extended flange 13 which engages at the rim of the casing. In mounting the box in place, an excavation is made in the ground and the casing inverted and placed in the same, the flange 11 resting at the bottom of the excavation.

The top 12 has a central opening and extending upwardly from the same a neck 14, the edge 15 of which is beveled. Inclined bracing ribs 16 integral with the neck and the top serve to strengthen the parts. The casing has an insulating lining 17 and this lining is extended to the under side of the top and the inside of the neck. It consists of any suitable material such as asbestos, felt, fiber or the like.

The meter 18 is encompassed by the casing and has the dial 19 upwardly disposed so that it can be viewed through the neck and the opening in the top. The meter is of any suitable type and is connected with the service main by pipes 20 in the usual manner.

A conduit 21 extends upwardly through the ground from the service main and terminates near the bottom of the casing, having a perforated cap or grating 22. The conduit 21 serves to conduct warm air from the neighborhood of the mains to the interior of the casing in cold weather, as the mains are buried below the frost line and the earth surrounding them is, of course, at a higher temperature than that surrounding the casing itself. The conduit 21 sometimes serves as a drain to eliminate moisture which may collect within the casing.

I prefer to employ a wooden plug 23 for closing the opening. The plug is so shaped that it can be easily inserted into the opening, and at the top has a cover 24, the edge 25 of which is beveled to fit evenly upon the edge 15 of the neck. At the lower end the plug has a plate 26 under which is movably arranged a member 27 having pivoted at each end a bolt 28. The bolts extend movably through guides 29 and are adapted to project laterally beyond the plate to engage at the under side of the top. The plug has an opening longitudinally thereof in which is arranged a sleeve 30. A lock bolt 31 extends through the sleeve and has a part 32 of angular section passing through the plate and engaging an opening of similar form in the member 27. The projecting extremity of the lock bolt is threaded and carries a nut 33 by means of which the member 27 is secured thereto. At the upper end the lock bolt has a head 34 of angular form which is arranged in an under-cut recess or key-hole 35 of the cover. I prefer to employ a key 36 having the lower end 37 extended and provided with lugs 38. These lugs are adapted to fit in the under-cut parts of the hole which is provided with slots 39 which permit the lugs to pass into the key hole. A recess 40 in the key is formed to receive the head of the lock body to permit the same to be turned. By turning the lock bolt in one direction the member 27 is actuated to withdraw the bolts, as is shown most clearly in dotted outline in Fig. 3. By reversing the operation, the bolts can be operated to engage at the under side of the top to hold the closure securely in place. At the upper end, the key is preferably provided with a crossbar 41, one end of which is bent and sharpened so that it can be employed to remove dirt or the like from the key-hole so that the key can be inserted therein.

Having thus described my invention, I claim as new, and desire to secure by Letters Patent:

1. A meter box, comprising a casing having an opening in the top thereof and a neck at said opening, said neck extending to the surface of the ground, a plug substantially filling said neck and having a cover fitting at the top of said neck, and locking mechanism at the lower end of said plug and adapted to engage under said neck to hold said plug in position, said mechanism being operable from the outside of said cover.

2. A meter box, comprising a casing having a top, an opening in said top, a neck extending upwardly from said opening, a plug removably mounted in said neck and having a cover adapted to engage at the rim of said neck, locking mechanism at the lower end of said plug and having a part adapted to be projected to engage at the under side of said top, and means for operating said locking mechanism to control the same from the outside of said cover.

3. A meter box, comprising a casing having a top provided with an opening therethrough, a neck extending through said top and extending upwardly from said opening, a plug removably mounted in said neck and having a cover adapted to engage at the rim of said neck, a plate at the lower end of said plug, a member movably arranged under said plate and having bolts, means for guiding said bolts on said plate, and a locking bolt extending through said plug and controlling said member, said cover having a recess, said bolt having a head within said recess and adapted to be engaged by a key formed to enter said recess.

4. A meter box, comprising a casing having a top provided with an opening therethrough, a neck extending upwardly from said opening and having a beveled rim, a plug adapted to be removably mounted in said neck and carrying a cover having the edge to fit upon said beveled rim, said plug carrying a plate at the lower end thereof, a member movable under said plate, and locking bolts carried by said member, said plate having means for guiding said bolts, said cover having an under-cut recess, a lock bolt extending longitudinally through said plug and controlling said member, said lock bolt having a head within said recess and adapted to be engaged by a key formed to enter said recess, whereby said member can be operated from the outside of said cover.

5. The combination with a meter box adapted to be buried in the earth and comprising a casing having an open bottom, a closure at the top of said casing, and means for operating said closure to lock and unlock the same from the outside of said casing, of a conduit having an open end arranged under said open bottom of said casing and adapted to conduct warm air from the neighborhood of the service main, to the meter box and to drain the meter box of moisture.

6. The combination, with a meter box having a neck, a removable plug in said neck and provided with a cover, said cover having an under-cut recess presenting slots, locking mechanism carried by said plug at the lower end thereof, and a locking bolt controlling said mechanism and having a head in said recess, of a key having lugs adapted to pass through said slots to enter said under-cut recess, and being provided with an opening formed to receive said head of said bolt whereby the same can be controlled by said key.

In testimony whereof I have signed my name to this specification in the presence of two subscribing witnesses.

LEWIS P. ANDREWS.

Witnesses:
 EARL L. DAVIS,
 DAMON M. FAY.